(No Model.)
W. F. BOWERS.
PROCESS OF MANUFACTURING SAMPLES OF HOSE, &c.
No. 530,678. Patented Dec. 11, 1894.
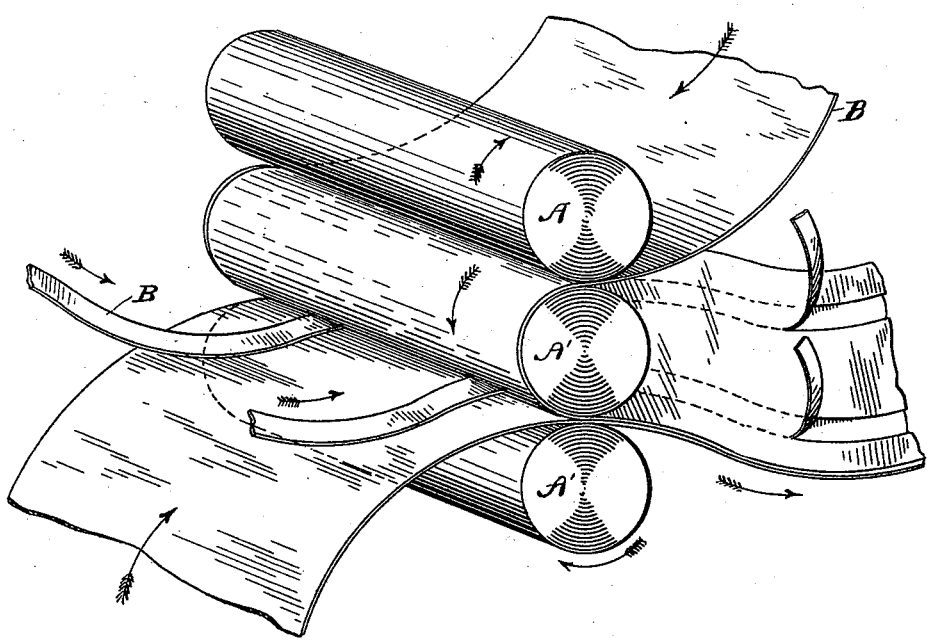
Witnesses.
Inventor.
William F. Bowers
by N. Acker
Atty.

UNITED STATES PATENT OFFICE.

WILLIAM F. BOWERS, OF SAN FRANCISCO, CALIFORNIA.

PROCESS OF MANUFACTURING SAMPLES OF HOSE, &c.

SPECIFICATION forming part of Letters Patent No. 530,678, dated December 11, 1894.

Application filed May 3, 1894. Serial No. 509,866. (No specimens.)

*To all whom it may concern:*

Be it known that I, WILLIAM F. BOWERS, a citizen of the United States, residing at San Francisco, in the county of San Francisco and State of California, have invented certain new and useful Improvements in Methods or Processes of Manufacturing Sample Pieces of Hose, Belting, or Packing; and I do hereby declare the following to be a full, clear, and exact description of said invention, such as will enable others skilled in the art to which it most nearly appertains to make, use, and practice the same.

This invention relates to a new and useful method or process of manufacturing sample piece of hose, belting, packing, or other articles composed of rubber and woven or other fabric, the object being to produce a sample piece having a portion of its surface free of the rubber or left in an unfinished condition, whereby the quality of the duck, canvas, or woven material used in the manufacture of the hose, belting, or packing may be readily ascertained from an inspection of the sample piece.

The advantages derived by the use of a sample piece having a free or unfinished portion I have fully set forth in another application for Letters Patent executed by me of even date herewith and filed concurrent with this application, consequently the same need not be set forth herein, reference being made to my other application.

In order to more fully understand my invention reference must be had to the accompanying sheet of drawing, which shows a perspective view of a rubber calendering machine showing the sheet of canvas or duck passing between the rolls thereof and the rubber coating or surface being pressed thereon, likewise showing a portion of the finished sheet with rubber removed.

In the drawing the letters A and A' are used to indicate the heating and pressing rolls of an ordinary calender machine employed in the manufacture of belting, packing and sheets, from which hose is made, composed of rubber and canvas or other fabric. Between these rolls is passed or run the sheet of canvas or duck B, which sheet of canvas or duck as passed between the rolls has a coating of rubber rolled or pressed thereon in the usual manner, which gives a coating of rubber to the sheet of canvas after having been carried between the rolls of the calender machine. This coating of rubber being in a soft condition after having passed through the heating rolls may easily be removed before the same is vulcanized.

Upon the surface of the sheet of canvas, before entering between the rolls of the calender machine, I place a series of strips or pieces of thin sheeting B', which strips or pieces of sheeting take up the rubber as run between the rolls, consequently after the sheet of canvas has been run between the rolls by simply removing the strips of sheeting or protecting strips the rubber covering that portion of the canvas sheet protected by the strips of sheeting will be removed, hence leaving the canvas at these points free of rubber. Of course it will be understood that the free portion of the canvas may be of any size, this depending upon the width of the protecting strips made use of. These strips may be used over a number of times for the reason that they can only take up so much of the rubber. After the strips of sheeting have been removed in order to leave the canvas exposed, as above described, the sheet of canvas with its rubber coating is placed within the vulcanizing press or heaters and the coating of the rubber is vulcanized in the ordinary manner.

The manner of making the sheet for manufacture of hose, belting or packing does not differ from that now made use of, excepting that I form a sheet having a portion of its canvas exposed or left unfinished.

The strips of sheeting in no manner adhere to the canvas, consequently the only resistance offered to the removal of the protecting strips takes place on the edges of the strips themselves due to the strength of the rubber, but this coating or surface of the rubber being in a soft, pliable, condition, it is obvious that the resistance offered to the removal of the strips is exceedingly slight. After the sheet of canvas has passed through the calender rolls and the protecting strips have been removed the sheet may be cut into a number of sample pieces for distribution among the dealers in this class of goods, which sample pieces show a finished and unfinished portion of the article.

Having thus described my invention, what I claim as new, and desire to secure protection in by Letters Patent of the United States, is—

1. The method of producing a sample piece for displaying the material used in the manufacture of hose, belting, packing, or similar articles containing rubber and woven or other fabric, which consists in coating the canvas sheet, or other fabric, with a layer of rubber and thence removing a portion of the rubber surface, whereby a free or uncoated portion of the canvas is exposed to view.

2. The method of producing a sample sheet or piece for displaying the quality of the material used in the manufacture of hose, belting, packing, or similar articles containing rubber and canvas or other woven fabric, which consists in placing upon the sheet of canvas or woven fabric a protecting strip which covers a portion of the canvas or woven material, coating the surface of the canvas or woven fabric and protecting strip with rubber, and thence removing the protecting strip and such portion of the rubber coating as adheres thereto, thereby leaving the portion of the canvas or woven fabric covered by the protecting strip free or exposed, whereby the material may be inspected.

In testimony whereof I affix my signature in presence of two witnesses.

WILLIAM F. BOWERS.

Witnesses:
N. A. ACKER,
M. G. LOEFLER.